United States Patent [19]

Sasaki

[11] Patent Number: 4,660,051

[45] Date of Patent: Apr. 21, 1987

[54] THERMAL TRANSFER PRINTING METHOD

[75] Inventor: Eiichi Sasaki, Sagamihara, Japan

[73] Assignee: Ricoh Company, Ltd., Tokyo, Japan

[21] Appl. No.: 824,303

[22] Filed: Jan. 30, 1986

Related U.S. Application Data

[63] Continuation of Ser. No. 603,208, Apr. 23, 1984, abandoned.

[30] Foreign Application Priority Data

Apr. 27, 1983 [JP] Japan .................................. 58-74668

[51] Int. Cl.[4] .............................................. G01D 15/10

[52] U.S. Cl. ................................ 346/76 PH; 400/120; 346/106

[58] Field of Search .................... 101/33, 34, 470–472; 427/208.4, 208.6, 208.8, 258, 261; 400/240, 120; 346/76 R, 76 PH, 76 L, 105, 106; 219/216, 216 PH

[56] References Cited

U.S. PATENT DOCUMENTS 4,527,171 7/1985 Takanashi et al. ............ 346/76 PH

*Primary Examiner*—Arthur G. Evans

*Attorney, Agent, or Firm*—Cooper, Dunham, Griffin & Moran

[57] ABSTRACT

In a thermal transfer printing method, the entire surface of a record medium is thermally coated with a layer of a colored material (to form a background color for an image to be subsequently thermally printed thereon). Images are thermally printed on the so-coated record medium using a thermal transfer process.

7 Claims, 4 Drawing Figures

THERMAL TRANSFER PRINTING METHOD

This is a continuation of application Ser. No. 603,208, filed Apr. 23, 1984, now abandoned.

BACKGROUND OF THE INVENTION

1. Field of the Invention

This invention relates to a thermal transfer printing method wherein a web of record medium and a carrier sheet or carrier web having a coat of dry ink melted by heat which is applied to the surface of the carrier sheet or carrier web are brought into overlapping relation and pressed together as they are moved between a platen roller and a printhead including a plurality of individual thermal elements, and the thermal elements are selectively energized to transfer the ink of the coat of dry ink from the carrier web to the web of record medium, to perform recording of images.

2. Description of the Prior Art

Generally, in a thermal transfer printer, a carrier web 1 including a base in film form and a coat of dry ink adapted to be melted by heat and a web 2 of recording medium, which may be ordinary paper, are moved, as shown in FIG. 1, in a subscanning direction. They are brought into overlapping relation and pressed together between a printhead 3 including a plurality of individual thermal elements corresponding to one line which are arranged in a main scanning direction and a platen roller 4, to successively perform recording by thermal trnasfer printing techniques data corresponding to one line. When the thermal transfer printer is of a direct heating type, the printhead 3 may be in the form of a thermal head in which heat generating materials are used for thermal elements. When the thermal transfer printer is of an electrically heated type (in which the base of the carrier web in film form is formed of a conductive material to utilize Joule heat), a head provided with a multiple needle electrode and return electrodes may be used. In FIG. 1, the numeral 5 designates a stripper plate for causing the carrier web 1 to make a sharp turn as it is separated from the web 2 of record madium to enable the coat of ink to be efficiently transferred from the carrier web 1 to the web of record medium.

In this type of heat transfer printer, it has hitherto been usual practice to use for the web 2 of record medium paper of specific quality which has good affinity with ink and which has a specific background color lest the background color of the web 2 of record medium should adversely affect the recorded images (particularly when color images are recorded). Moreover, the thermal transfer printer of the prior art has suffered the disadvantage that, owing to inability to come into intimate contact with each other, the carrier web 1 and the web 2 of record medium might be displaced from each other when they are brought to overlapping relation, resulting in a displacement of images recorded on the web 2 of record medium by transfer printing.

SUMMARY OF THE INVENTION

This invention has been developed for the purpose of obviating the aforesaid disadvantages of the prior art. Accordingly, the invention has as its object the provision of a thermal transfer printing method capable of recording images of high quality in a stable manner without developing a displacement of the recorded images irrespective of the quality and background color of paper used as record medium.

In the thermal transfer printing method according to the invention, a coat of colored material of a specific color that would constitute a desired background color or a coat of transparent material is applied to the entire area of the record medium beforehand, prior to recording images on the record medium by the usual process of the thermal transfer printing.

A colored material of white color is usually used to provide a colored record medium with a necessary background color. Thus, when this type of colored material is used, it is possible to record images on a web of record medium which may be black in color. A material that provides the record medium with a transparent coat may be used in place of the colored material when a white paper is used as a record medium, so as to improve the affinity of the medium with a image forming material used in thermal transfer printing and enable intimate contact to be achieved between the carrier web and the web of record medium. Additionally, when the record medium is in the form of a transparent film and it becomes necessary to view the images recorded thereon through an overhead projector, the material that provides the record medium with a transparent coat can be advantageously used.

DESCRIPTION OF THE PREFERRED EMBODIMENTS

Figure 1:
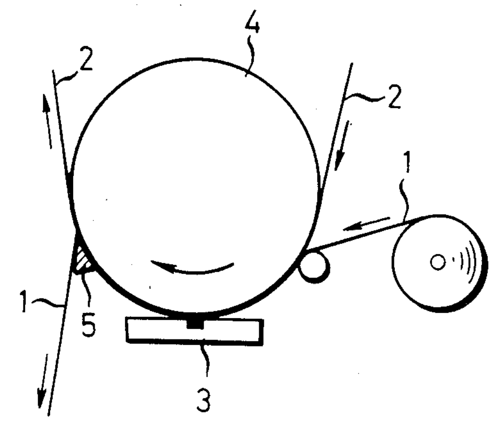
FIG. 1 PRIOR ART
FIG. 1 is a schematic view of a prior art thermal transfer printer, showing essential parts of its basic constructional form.
Figure 2:
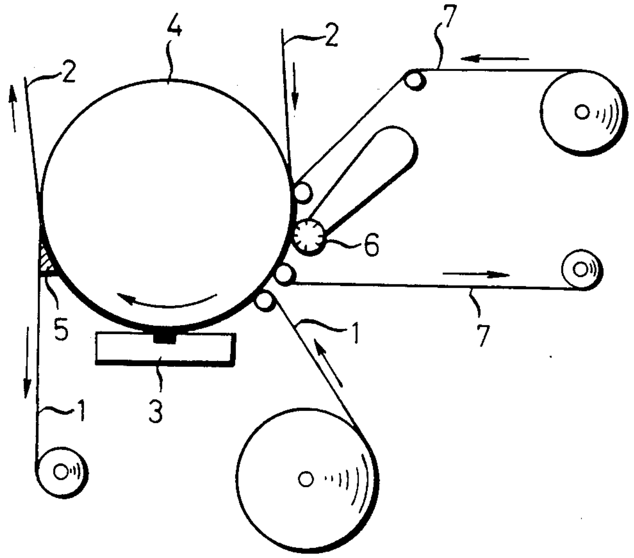
FIGS. 2 and 3 are schematic views in explanation of the constructional forms suitable for carrying the thermal transfer printing method according to the invention into practice.

FIG. 2 shows one constructional form of the thermal transfer printer suitable for carrying the thermal transfer printing method according to the invention into practice. In its basic construction, the thermal transfer printer shown in FIG. 2 is similar to that shown in FIG. 1 in having a printhead 3 and a platen roller 4 and allowing a carrier web 1 and a record medium web 2 of ordinary paper to pass between the printhead 3 and platen roller 4 while the carrier web 1 and record medium web 2 are brought to overlapping relation and pressed together to successively record images for one line from the former to the latter. What distinguishes the thermal transfer printer shown in FIG. 2 from that shown in FIG. 1 is that the former is additionally provided with a heating roller 6 located on the record medium feeding side and maintained in contact with the platen roller 4. When image recording operations are performed, a web 7 bearing a layer of a colored material for providing a background color to the record madium web 2 is fed to a nip between the platen roller 4 and heating roller 6 in synchronism with the rotation of the platen roller 4, so as to thermally transfer the layer of the colored material from the web 7 to the record medium web 2 before images are formed by thermal transfer printing from the carrier web 1 to the record medium web 2.

Figure 3:
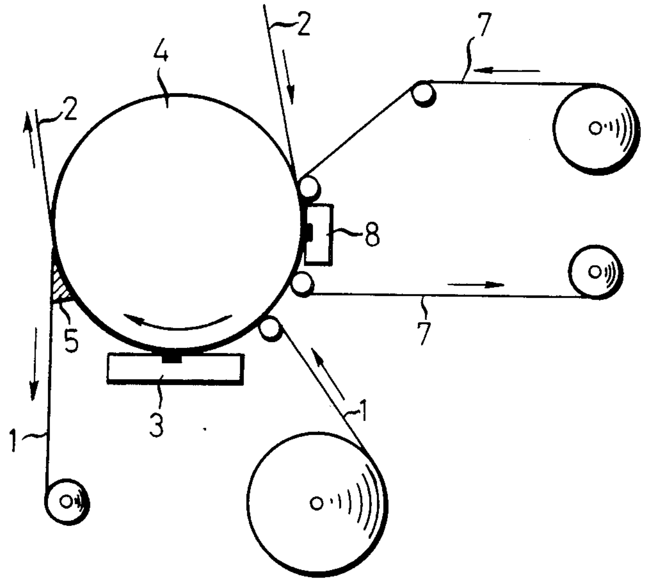

FIG. 3 shows another constructional form of the thermal transfer printer suitable for carrying the thermal transfer printing method according to the invention into practice. In the constructional form shown in FIG. 3, a thermal head 8 is provided in place of the heating roller 6 of the constructional form shown in FIG. 2, and in other respects the thermal transfer printer shown in FIG. 3 is similar to that shown in FIG. 2.

In one type of thermal transfer printer for recording color images, the carrier web 1 bears a plurality of color image forming material sectors of yellow, magenta and cyan each having a recording capacity for one page which are arranged in end-to-end relation in a direction in which the carrier web 1 is fed. This type of carrier web 1 is used to record images of different colors in the same position of the record medium web 2 by repeatedly moving the record medium web 2 back and forth, so as to record color images by the method of original colors mixing. In this type of thermal transfer printer, there is provided means, not shown, for moving the heating roller 6 or thermal head 8 into pressing contact with the platen roller 4 with a predetermined pressing force and out of contact therewith. Such means is operative to move the heating roller 6 or thermal head 8 away from the platen roller 4 as soon as recording of images in the first color is finished.

Figure 4:
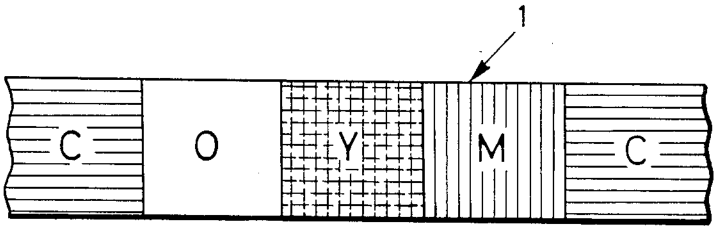
FIG. 4 is a schematic view of the carrier web including a plurality of sectors of different colored image forming materials according to the invention suitable for use in recording color images.

In the case of the thermal transfer printer for recording color images as described hereinabove, the carrier web 1 of the type shown in FIG. 4 may be used to eliminate the need to provide a separate system for performing application of a coat of a colored material to provide the record medium web 2 with a necessary background color. As shown in FIG. 4, the carrier web 1 bears a background color sector O of a colored material for applying a coat of white color or a transparent coat to the record medium web 2, besides the yellow sector Y, magenta sector M and cyan sector C referred to hereinabove which are arranged in end-to-end relation in a direction in which the carrier web 1 is fed. Prior to recording color images on the record medium web 2, the background color sector O of the carrier web 1 and the record medium web 2 are moved past the printhead 3 to apply a coat of background color or a coat of transparent material to the entire surface of a portion of the record medium web 2 corresponding to one page. Then, the record medium web 2 alone is moved backwardly a distance corresponding to one page so that recording of color images by the usual process of thermal transfer printing by means of the color material sectors Y, M and C may be performed on the record medium web 2. When the record medium web 2 is moved backwardly as described hereinabove, the printhead 3 is moved away from the platen roller 4.

From the foregoing description, it will be appreciated that in the thermal transfer printing method according to the invention, a coat of colored or transparent material is applied by thermal transfer printing to the entire surface of the record medium web before recording to images is performed by thermal transfer printing. This enables recording of images of high quality to be achieved even if the record medium web is paper of poor affinity with a image forming material or color image forming materials, because the images can be fixed in a stable manner. Thus, plain paper of any background color may be used as the record medium web, and the problem with regard to inability to bring the carrier web and the record medium web into intimate contact with such other can be obviated.

What is claimed is:

1. A thermal transfer printing method comprising the steps of:

applying a coat of colored material by thermal transfer to the entire surface of a record medium web to form thereon a coating of a specific background color before recording of images thereon is performed;

superposing the record medium web over a carrier web having a coat of dry ink meltable by heat applied to its surface and pressing them together, with the coating of a specific background color facing the carrier web, as they are fed between a printhead including a plurality of individual thermal elements and a platen roller; and selectively energizing the thermal elements to record images on the record medium web by thermal transfer of the coat of dry ink from the carrier web onto selected portions of the record web.

2. A thermal transfer printing method as in claim 1, wherein said carrier web bears a plurality of sectors of color image forming material including a yellow sector, a magenta sector and a cyan sector each having a recording capacity for one page and arranged in end-to-end relation in the direction in which the carrier web is fed, and a sector of a background color applying material also having a recording capacity for one page and also arranged in end-to-end relation to the plurality of the sectors of color image forming material, whereby a coat of a background color material can be applied to the entire surface of a portion of the record medium web corresponding to one page, by thermal transfer from said sector of a background color applying material of the carrier web, before color images are formed on said portion by using said sectors of color image forming material.

3. A thermal transfer printer comprising:

means for supplying a transfer sheet having groups of sectors, wherein one of the sectors in a group bears a background material of a specific background color material and the other sectors in the same group bear materials of respective different image colors;

means for supplying a record medium which comprises a succession of copy area surfaces; and means including a thermal head for transferring the specific background color material of one group of sectors by thermal transfer from the transfer sheet to an entire copy surface area of the record medium, and for transferring thereafter selected portions of at least one of the materials of said different image colors of the same group of sectors by thermal transfer from the transfer sheet to the same copy surface area of the record medium.

4. A thermal transfer printer as in claim 3 in which the means for transferring comprise means for transferring the background color material from one group of sectors of the transfer sheet to one entire copy surface area of the record medium and transferring a plurality of different color materials from the same group of sectors to the same copy surface area of the record medium.

5. A thermal transfer printer as in claim 4 in which the transfer sheet is in the form of a transfer web and the record medium is in the form of a record web.

6. A thermal transfer printer comprising:

means for supplying a record medium having at least one copy surface;

means for coating the entire copy surface by thermal transfer printing with a coating of a specific background color;

means for supplying a transfer sheet having a group of sectors each of which comprises a material of a different image color;

means including a thermal printhead for transfering by thermal printing from the transfer sheet to the copy surface coated with said coating of a specific background color, material of at least one of said image colors to form a color image thereon.

7. A thermal transfer printer as in claim 6 in which the group of sectors comprises a sector of a material of said specific background color and the means for coating comprises a part of said means for transferring by thermal printing from the transfer sheet to the copy surface.

* * * * *